(12) United States Patent
Simonsohn et al.

(10) Patent No.: US 11,996,682 B2
(45) Date of Patent: May 28, 2024

(54) HEAT SHRINK COMPONENT AND METHOD OF ASSEMBLING A HEAT SHRINK COMPONENT

(71) Applicant: Tyco Electronics Raychem GmbH, Ottobrunn (DE)

(72) Inventors: Thilo Simonsohn, Munich (DE); Christian Heindl, Munich (DE)

(73) Assignee: TYCO ELECTRONICS RAYCHEM GMBH, Ottobrunn (DE)

( * ) Notice: Subject to any disclaimer, the term of this patent is extended or adjusted under 35 U.S.C. 154(b) by 804 days.

(21) Appl. No.: 16/741,810

(22) Filed: Jan. 14, 2020

(65) Prior Publication Data

US 2020/0153223 A1    May 14, 2020

Related U.S. Application Data

(63) Continuation of application No. PCT/EP2018/068163, filed on Jul. 5, 2018.

(30) Foreign Application Priority Data

Jul. 14, 2017    (EP) .................................... 17181401

(51) Int. Cl.
*B29C 63/42*    (2006.01)
*B29C 61/06*    (2006.01)
(Continued)

(52) U.S. Cl.
CPC ..... *H02G 15/1806* (2013.01); *B29C 61/0616* (2013.01); *B29C 65/342* (2013.01); *F16L 47/22* (2013.01); *B29C 63/42* (2013.01)

(58) Field of Classification Search
CPC . H02G 15/1806; B29C 61/0616; F16L 47/22; H05B 3/40; B32B 1/08
See application file for complete search history.

(56) References Cited

U.S. PATENT DOCUMENTS 2,027,962 A    1/1936    Currie
3,086,242 A    4/1963    Cook et al.
(Continued)

FOREIGN PATENT DOCUMENTS

DE    1941327 A1    8/1969
DE    2410289 A1    9/1975
(Continued)

OTHER PUBLICATIONS thoughtco.com/table-of-electrical-resistivity-conductivity (Year: 2020).*
(Continued)

*Primary Examiner* — Alison L Hindenlang
*Assistant Examiner* — Debjani Roy

(57) ABSTRACT

A heat shrink component includes a heat shrink layer and a heating unit in thermal contact with at least a part of the heat shrink layer and heating the heat shrink layer to a heat shrink temperature. The heating unit includes an electrically conductive lead formed of copper and/or aluminum and having an electrical conductivity of more than $3 \cdot 10^7$ S/m. The heat shrink component has a first dimension in an expanded state and a second dimension in a shrunk state after heating. The first dimension is larger than the second dimension.

16 Claims, 3 Drawing Sheets

(51) Int. Cl.
   *B29C 65/34* (2006.01)
   *F16L 47/22* (2006.01)
   *H02G 15/18* (2006.01)

(56) References Cited

U.S. PATENT DOCUMENTS

| | | | |
|---|---|---|---|
| 4,177,446 A | 12/1979 | Diaz | |
| 4,944,987 A * | 7/1990 | Cordia | B29C 66/91655 219/535 |
| 5,318,829 A * | 6/1994 | Tada | B32B 27/32 428/522 |
| 5,741,579 A * | 4/1998 | Nishizawa | H01L 23/433 257/E23.09 |
| 6,686,562 B1 * | 2/2004 | Weiss | H05B 3/34 219/217 |
| 10,542,587 B2 * | 1/2020 | Gagnon | F24H 3/002 |

FOREIGN PATENT DOCUMENTS

| | | |
|---|---|---|
| EP | 0008912 * | 3/1980 |
| EP | 0008912 A1 | 3/1980 |
| EP | 0024179 A1 | 8/1980 |
| EP | 0798099 A2 | 1/1997 |
| EP | 1190839 B1 | 6/2004 |
| FR | 2512394 A1 | 3/1983 |
| WO | 0219494 A1 | 3/2002 |

OTHER PUBLICATIONS

Copper wire (Year: 2006).*
PCT Notification, International Search Report and Written Opinion of the International Searching Authority, Intl App. No. PCT/EP2018/068163, dated Oct. 5, 2018, 13 pages.
Abstract of EP 1190839, dated Jun. 23, 2004, 2 pages.
European Patent Communication, Application No. 17181401.5-1201, dated Jan. 2, 2020, 6 pages.
Communication pursuant to Article 94(3) EPC from the European Patent Office in Appln. No. 17 181 401.5-1201, dated Mar. 2, 2021, 4 pp.

* cited by examiner

HEAT SHRINK COMPONENT AND METHOD OF ASSEMBLING A HEAT SHRINK COMPONENT

CROSS-REFERENCE TO RELATED APPLICATIONS

This application is a continuation of PCT International Application No. PCT/EP2018/068163, filed on Jul. 5, 2018, which claims priority under 35 U.S.C. § 119 to European Patent Application No. 17181401.5, filed on Jul. 14, 2017.

FIELD OF THE INVENTION

The present invention relates to a heat shrink component and, more particularly, to a heat shrink component with an electrically conductive lead.

BACKGROUND

Heat shrink components are articles made from material which shrinks from an expanded state into a shrunk state with much smaller dimensions by applying a sufficient amount of heat. Heat shrink components are widely spread as joint sleeves or other cable accessories.

A heat-recoverable article (an independently dimensionally heat-unstable article) can function as a heat shrink layer. In general, such an article is made of a material capable of having the property of elastic or plastic memory imparted thereto which is heated to a certain temperature and distorted under pressure to a configuration different from its normal configuration and then cooled while kept under pressure. If the article is made of a material which is wholly or partly crystalline, is at least partly cross-linked in the amorphous areas, and is distorted at a temperature at or above the crystalline melting point of the material, the article will have elastic memory. An article with elastic memory will not recover towards its original configuration until it is again heated at least to its crystalline melting temperature. If the article is made of a non-crystalline material, it is heated to a temperature at which the article can be distorted by pressure, and the distorted article then has the property of plastic memory. Examples of heat-recoverable materials are found in U.S. Pat. Nos. 2,027,962 and 3,086,242. Of course the heat shrink layer can be fabricated from any suitable material, as this is known to a person skilled in the art. Moreover, also multilayer arrangements can additionally comprise elastic and/or electrically semi-conductive and conductive layers.

In order to install heat shrink products for low-voltage ("LV"), medium-voltage ("MV"), and high-voltage ("HV") applications, typically open flames, such as gas torches, are used. More rarely, also hot air guns with several kilo watt ("kW") of power are employed. Hot air guns, however, are limited to thin walled products, like LV sleeves and molded parts with a low wall thickness in the range of 1 to 4 mm. For instance for electronic applications, where sleeves typically have wall thicknesses below 1 mm in the expanded state, hot air guns or tunnel heaters with ceramic radiation features are commonly used.

From the perspective of safety, the use of open flames is disadvantageous. Furthermore, it is desired to reduce the amount of energy needed for installing products. In some cases it is also desired to reduce the amount of heat generated during installation. Consequently, it is desirable to use other energy sources than open flames, preferably electrical energy.

It is known to shrink heat shrinking products by adding at least one layer to the product that transforms electrical energy into heat. From DE 1941327 A1, an electrically conductive heat-recoverable article is known which recovers by passing an electrical current through the article to raise it to its recovery temperature. The conductive article, e.g. a tubular sleeve, is placed in good heat-transfer relationship to an electrically non-conductive heat recoverable member, e.g. a tubular sleeve, so as to act as heater for this non-conductive member, the two members recovering substantially simultaneously. The conductive material of the sleeve is carbon-black filled cross-linked polyethylene which is made heat-recoverable. Other cross-linked polymers, non-crystalline polymers such as polyurethane and ionomers, as well as elastomers such as silicone rubber are disclosed. A conductive sleeve is surrounded by two insulating sleeves, or a slit conductive sleeve surrounds a heat-recoverable non-conductive sleeve and is peeled away after the non-conductive sleeve is fully recovered. Electrical connections to the conductive sleeves are established via alligator clips or other conventional clamps or electrodes.

However, these known arrangements suffer from the disadvantage that the time for performing the installation is usually greater than 15 minutes and therefore too long to be cost effective.

Furthermore, it is known to provide heating systems with fluid pipes in order to prevent fluid conducted by the pipes from freezing. These defrosting systems, however, allow only maximum temperatures of about 60 to 80° C. and are therefore not applicable for shrinking heat shrink products which require temperatures above 120° C.

Outside the field of energy technology, it is known to use electrical heating for jointing pipes using thermoplastic coupling parts. As for instance disclosed in European patents EP 1190839 B1 and EP 0798099 B1, a molded part with embedded wires is positioned over the end portions of the two pipes to be joined. An electronic drive system linked to a power source then generates sufficient heat to melt the ends of the pipes which then are welded with each other and/or the molded part. For this field of application, the pipes essentially do not change their original diameter and each joint component is only used for one particular diameter of pipes. When applying such a system to a heat shrink component which usually undergoes a diameter reduction of around 10% to 75% of the expanded diameter during the heat shrink process, the molded part would lose mechanical contact to the heat shrink product.

Finally, there exist multiple heating systems in the art which are based on resistance wires. These wires are made from special metal alloys that have resistance values which are about 10 to 100 times higher than those of copper or aluminum. The disadvantage of using resistance heating wires can be seen in the fact that these standard resistance heating wires have a high specific resistance and therefore provide a high density of dissipated heat energy, so that for reaching a temperature of 120° C. and higher by applying a voltage of about 24 V, only a short length of wire is needed. This rather short wire length causes severe problems to properly distribute the heat over the entire surface and volume of a typical heat shrink product such as an MV joint body. In addition, the costs of heating wires are much higher than of for instance copper wire.

SUMMARY

A heat shrink component includes a heat shrink layer and a heating unit in thermal contact with at least a part of the heat shrink layer and heating the heat shrink layer to a heat shrink temperature. The heating unit includes an electrically conductive lead formed of copper and/or aluminum and having an electrical conductivity of more than $3 \cdot 10^7$ S/m. The heat shrink component has a first dimension in an expanded state and a second dimension in a shrunk state after heating. The first dimension is larger than the second dimension.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
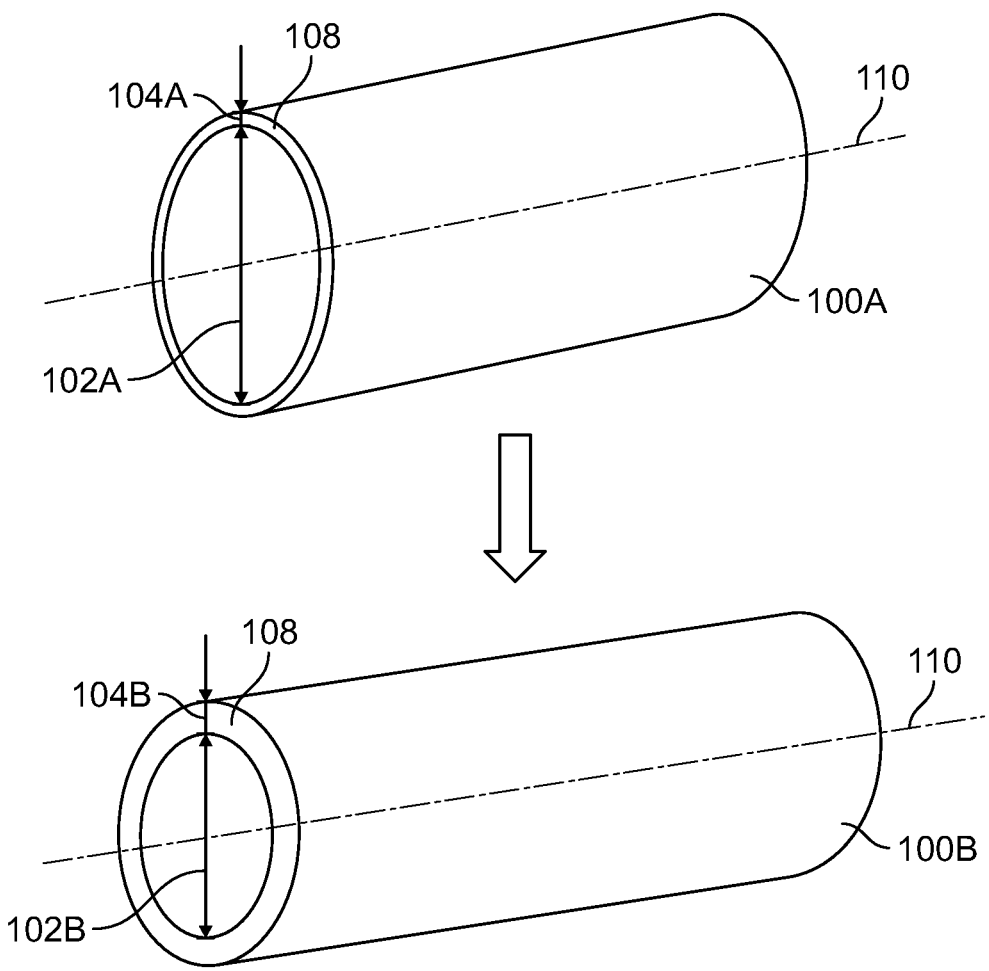
FIG. 1 is a schematic diagram of a heat shrinking process of a heat shrinkable joint sleeve.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. Furthermore, several aspects of the embodiments may form—individually or in different combinations—solutions according to the present invention. The following described embodiments thus can be considered either alone or in an arbitrary combination thereof.

The term "high-voltage" as used in the following is intended to relate to voltages above approximately 1 kV. In particular, the term high-voltage is intended to comprise the usual nominal voltage ranges of power transmission, namely medium voltage, MV, (about 3 kV to about 72 kV), high-voltage, HV, (about 72 kV to about 245 kV), and also extra high-voltage (up to presently about 500 kV). Of course also higher voltages may be considered in the future. These voltages may be direct current (DC) or alternating current (AC) voltages. In the following, the term "high-voltage cable" is intended to signify a cable that is suitable for carrying electric current of more than about 1 A at a voltage above approximately 1 kV. Accordingly, the term "high-voltage accessory" is intended to signify a device that is suitable for interconnecting high-voltage facilities and/or high-voltage cables. In particular, a high-voltage accessory may either be an end termination or a cable joint. The present invention is also applicable to the so-called "low-voltage", LV, range that relates to voltages below 1 kV. The principles of the present invention may further be applied to heat shrink products used for electronic applications.

A heat shrinking process of heat shrinkable joint sleeve 100A, 100B is shown in FIG. 1. The heat shrink sleeve is in the expanded state 100A where it has first dimensions. The heat shrink sleeve in the expanded state 100A has an inner diameter 102A which is larger than the outer diameter of a component to be covered and a wall thickness 104A that is thinner than in the finally mounted state. By applying heat, the heat shrink sleeve is transformed from the expanded state 100A into a heat shrink sleeve in the shrunk state 100B (indicated by the arrow). In order to be shrunk under the influence of heat, the sleeve 100 has a heat shrink layer heat.

A heat-recoverable article (an independently dimensionally heat-unstable article) is used as the heat shrink layer 108. In various embodiments, the heat shrink layer 108 can be fabricated from any suitable material. In other embodiments, the multilayer arrangements additionally comprise elastic layers. Heat shrink layers 108 and/or elastic layers may comprise electrically insulating and/or electrically semi-conductive and/or conductive layers or components.

As shown in FIG. 1, the shrunk sleeve 100B has an inner diameter 102B that fits tightly over the covered component and a larger wall thickness 104B as compared to the expanded state 100A. The heat shrink process leads to a reduction of diameter 102B of up to 75% of the diameter 102A in the expanded state 100A. The principles according to the present invention can be applied to straight tube shaped sleeves 100 as well as to differently shaped covers for branch joints, elbows, bends, and the like. The component onto which the sleeve 100 is shrunk may be cylindrical or it may have regions with a cross-section that is polygonal and/or that is varying along the longitudinal axis of the component.

The heat shrinking step is performed by applying electrical energy via electrically conductive leads 106 with an electrical conductivity of more than $3 \cdot 10^7$ S/m which comprise copper and/or aluminum. In an embodiment, the electrically conductive lead 106 comprises copper and has an electrical conductivity greater than $4 \cdot 10^7$ S/m.

FIGS. 2-5 illustrate examples of how the electrically conductive leads 106 that form a heating unit 120 can be arranged on a heat shrink product. The leads 106 may be positioned with direct contact to a heat shrink layer or may be positioned on a layer of non-shrink material, such as an elastomeric layer or a thermoplastic layer. Terminals are led to the outside for connecting a power source, such as a battery supplying a DC voltage of, for example, 24 V. In an embodiment, the power source provides a DC voltage below 60 V or an AC voltage of 25 V root mean squared ("RMS").

A length of the electrically conductive lead 106 is determined by a diameter and a resistance value that is to be reached and amounts to around 1 to 15 m when choosing a diameter in a range of 0.1 mm to 0.4 mm. The resulting overall resistance of such heating units 120 may for instance be in a range of 0.3Ω to 6.0Ω at 23° C.

Figure 2:
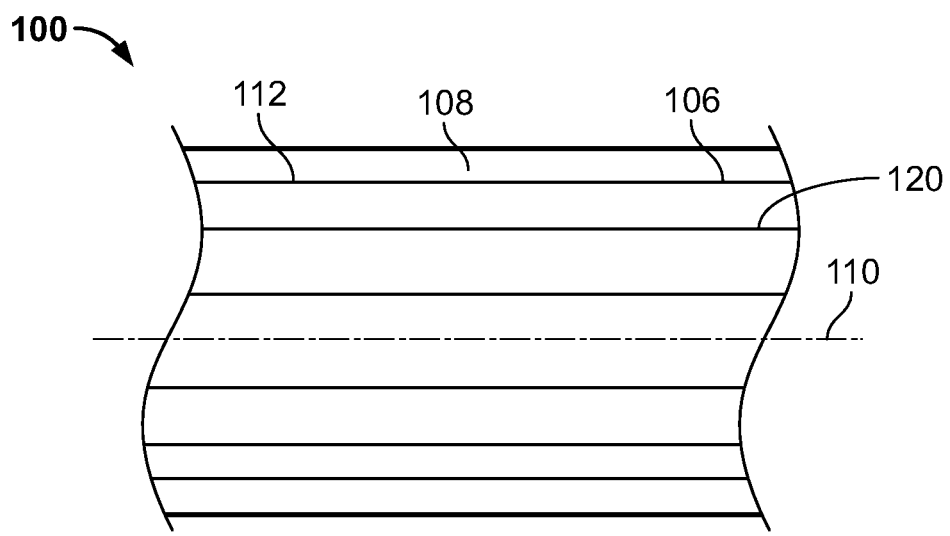
FIG. 2 is a schematic diagram of a heating unit according to an embodiment.

In the embodiment shown in FIG. 2, a plurality of elongated wire sections 112 are arranged in parallel to a longitudinal axis 110 of the heat shrink sleeve 100. The individual wire sections 112 may be serially interconnected in the fashion of a meandering structure to form one continuous electrical lead 106. Additionally, some of the longitudinal sections 112 may be interconnected to form an elongated closed loop, a plurality of those loops being interconnected in parallel. The sections 112 may either be arranged on an outer surface or on an inner surface of the heat shrink sleeve 100. The sections 112 may also be covered by further layers. The sections 112 may also be arranged in different planes with respect to the center line 110.

Arranging the wire sections 112 in parallel to the longitudinal axis 110 of the heat shrink sleeve 100 is also advantageous from an electro-physical point of view because undesired coil structures can be avoided. If necessary, the loops of wire interconnecting the wire sections 112 for providing a closed path for the current may be arranged at the periphery of the sleeve 100 in a way that they can be cut off after the shrinking process is completed, leaving in place only the longitudinal wire sections.

The embodiment shown in FIG. 2 having the longitudinal wire sections 112 has the advantage that, upon shrinking of the heat shrink layer 108, the wire sections 112 become arranged closer to each other, but are not significantly deformed or dislocated. If the covered component has a polygonal cross-section and/or has dimensions that vary along the longitudinal axis, the wire sections 112 conform to this outer silhouette to some extent. Still, no sharp edges or disruptions during the heat shrinking process can occur. This means that separations or areas of increased resistance due to strong deformation of the wires are less likely.

Figure 3:
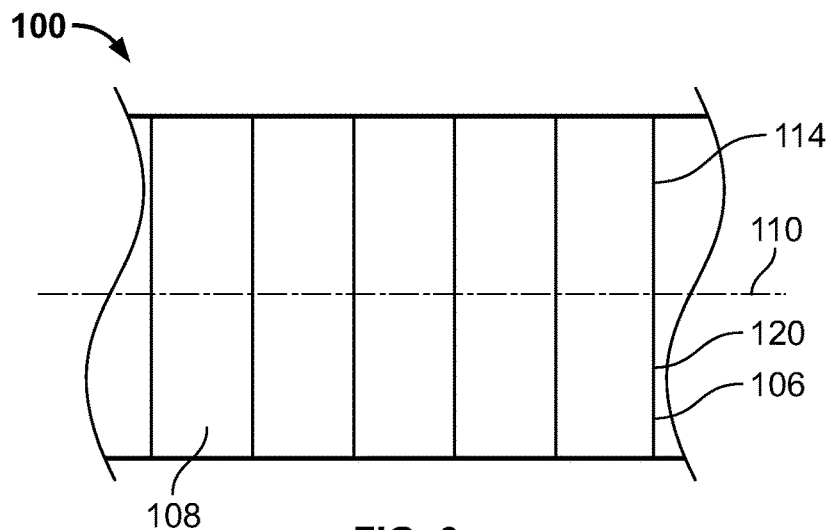
FIG. 3 is a schematic diagram of a heating unit according to another embodiment.

In an embodiment shown in FIG. 3, a plurality of ring-shaped wires 114 are arranged on the sleeve 100 to form the electrically conductive lead 106. These ring-shaped wires 114 are arranged equidistantly along the longitudinal axis 110 and are essentially perpendicular to the longitudinal axis 110. In other embodiments, the ring-shaped wires 114 can also be arranged with varying distances between each other. Moreover, when using an elliptical shape instead of a circular geometry, the rings 114 can also be arranged to include an angle other than 90° with the longitudinal axis 110. The rings 114 may electrically be connected in series and/or in parallel. For a serial connection, the rings 114 may not be entirely closed around the circumference of the heat shrink sleeve 100.

Figure 4:
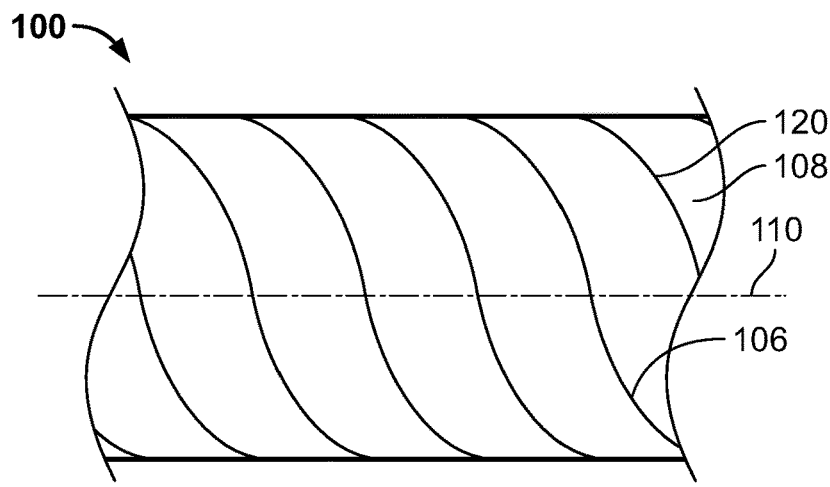
FIG. 4 is a schematic diagram of a heating unit according to another embodiment.

In an embodiment shown in FIG. 4, one continuous electrically conductive lead 106 is wound in a helical configuration around the heat shrink layer 108. This configuration is particularly easy to assemble.

Figure 5:
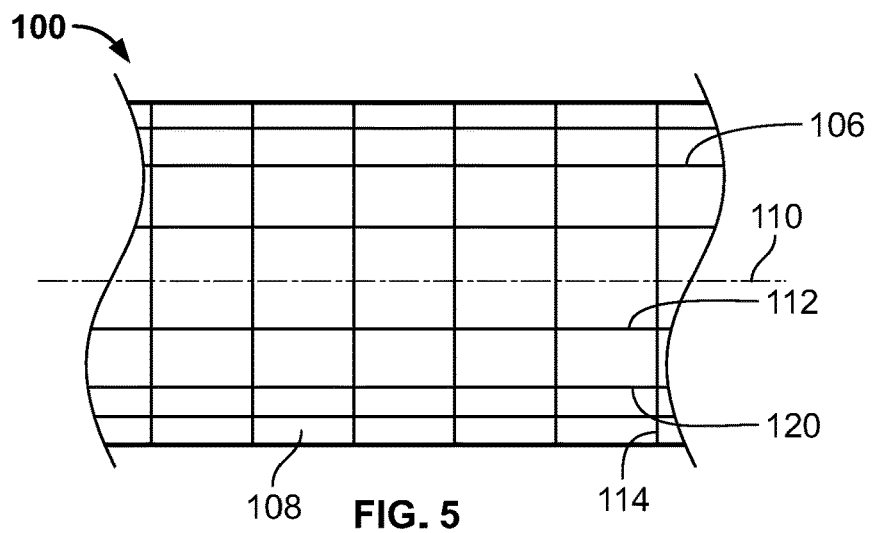
FIG. 5 is a schematic diagram of a heating unit according to another embodiment.

The above-described arrangements according to FIGS. 2-4 can also be combined with each other as is exemplarily depicted in FIG. 5. In the embodiment of FIG. 5, one layer of longitudinal sections 112 is combined with one layer of ring-shaped wires 114, wherein it is arbitrary which layer is the top layer and which one the bottom layer. In another embodiment, more than two layers can be combined to form a heating unit. Electrically, these layers may either be connected in parallel or serially. Advantageously, the wires 112, 114 in the different layers are to be electrically insulated against wires 112, 114 of another layer. This may be achieved by using wires 112, 114 that are individually covered with an electrical insulation and/or by arranging an insulating material between adjacent layers of wire 112, 114.

Figure 6:
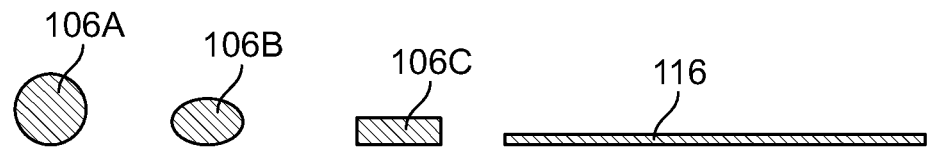
FIG. 6 is a sectional end view of a plurality of electrically conductive leads.

Several examples of electrically conductive leads 106 are shown in FIG. 6. An electrical resistance suitable for generating temperatures around 120° C. and up to 450° C. from safety voltages (e. g. 24 V DC) can also be realized with a highly conductive material when reducing the cross-sectional area and/or enhancing the length accordingly. The cross-section of the wires 106 may be circular (electrically conductive lead 106A), elliptic (electrically conductive lead 106B), or polygonal (electrically conductive lead 106C). Furthermore, the electrically conductive lead may also be formed by a thin film 116. It should be noted that the drawings are not exactly to scale throughout the Figures; in particular, the thickness of the electrically conductive film 116 is exaggerated.

The electrically conductive film 116 shown in FIG. 6 may, for instance, be formed from a metallization layer that is etched by a photolithography process. Alternatively, also screen printing or other printing techniques can be used for depositing the electrically conductive film 116 on the heat shrink layer, or on an additional layer, i. e. a thermoplastic film.

Figure 7:
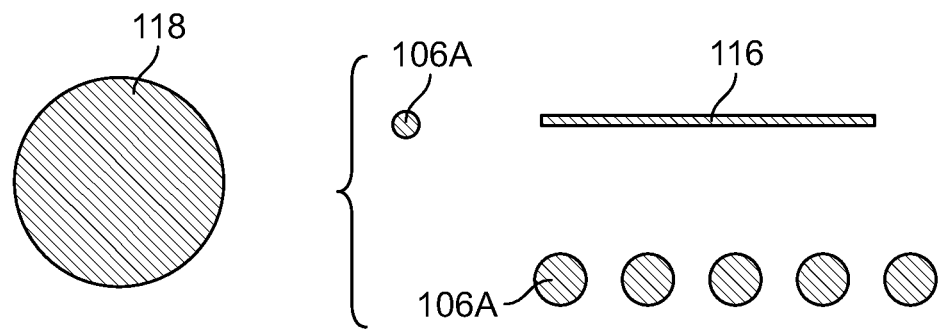
FIG. 7 is a sectional end view of a plurality of electrically conductive leads.

The electrical resistance of the electrically conductive lead 106 will now be described in greater detail with reference to FIG. 7. FIG. 7 shows arrangements that have the same electrical resistance, leading to the same heating effect when powered with the same voltage. In particular, the cross section of a standard resistance heating wire 118 is compared to a copper wire 106 or an electrically conductive copper film 116. When assuming that the copper wire 106A and the electrically conductive film 116 have only 1% of the specific resistance of the resistance wire 118, they need to have a cross sectional area of only 1% of the cross-sectional area of the resistance wire 118 in order to provide the same overall resistance for a piece of lead having the same length. Alternatively, a copper wire 106A having 20% of the cross-sectional area of the resistance wire 118 has the same resistance as the resistance wire 118, if the copper wire 106A has 5 times the length of the resistance wire 118.

Due to economic and reliability considerations, the number and diameter of the heating wires 106 needs to be within certain limits. If the wires 106 have very small diameters, their numbers and/or length need to be reduced. Otherwise, the resistance increases too much and voltages of 24 V or below cannot generate a sufficiently high current to heat up the wires 106 to temperatures of at least 110° C. On the other hand, if the wires 106 have too large cross-sections, their resistance may become too low. Then the length has to be increased, in order to increase the resistance. Otherwise, the wires 106 would not be heated up sufficiently. Thereby costs are increased. A further option is to use (at least in particular areas of the heat shrink component) two or more electrical circuits of heating wires which are connected in parallel. The electrical current then splits up according to the relative resistance of the circuits. This allows choosing wires 106 with smaller cross-sections, while achieving the same resulting resistance as with a larger size wire. In other words, two wires are connected in parallel and have each half of the cross-section compared to a benchmark wire. This principle, however, gets to some limits regarding economic considerations, such as the cost of fine wires relative to standard wires, and regarding reliability issues, because handling of extremely fine wires with diameters of less than 100 μm is cumbersome.

Figure 8:
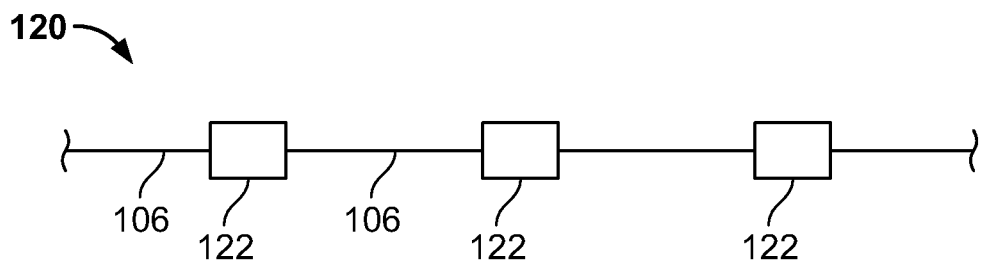
FIG. 8 is a schematic diagram of a heating unit according to another embodiment.

In addition to only using the electrically conductive lead 106 as the heating unit 120, additional heating elements 122 can also be provided, as shown in FIG. 8. In an embodiment, the electrically conductive lead 106 generates only negligible amounts of heat. The main part of the heat is generated by the additional heating elements 122. The heating elements 122 may for instance be formed from semiconductor heating elements. The electrically conductive leads 106 that are interconnecting the heating elements 122 may either be formed as sections of wire, or by film-shaped electrically conductive leads. Any of the diameters explained with reference to FIG. 6 can be employed. In an embodiment, the semiconductor heating elements 122 may have a positive temperature coefficient (PTC) so that an inherent overheating protection is provided.

In an embodiment, sensors may be added to the heat shrink component. These sensors can be configured to monitor and/or drive the heating and shrinking process and give feedback for instance to the cable jointer and/or the electric drive system e. g. whether the installation has been finished successfully. In particular, when realizing the heating unit 120 as a thin film arrangement 116, the sensors and the heating unit 120 can be formed on a common flexible substrate that is attached to the sleeve.

The embodiments of the present invention are capable of shrinking widely used energy products, like LV, MV, and even HV joint bodies, terminations, sleeves (such as rejacketing sleeves), and molded parts (such as break out boots and caps) without using an open flame and instead using electrical energy. Because the application typically is a field installation, the power source beneficially uses batteries, either available in the van of the cable jointer staff or to be carried to the place of installation. Alternatively, a generator, either available in the van or transportable over limited distances, can be used. For safety reasons, the voltage can be limited to values in the magnitude of 20 V, at maximum 24 V. In order to be compatible with installation times that are reached using open flames, the shrink times of a typical MV joint body should not exceed a maximum of 10 minutes.

The present invention can be employed with the following exemplary specific dimensions and characteristics.

In contrast to conventional resistance wires, the conductivity of the wires 106 is at least $3 \cdot 10^7$ S/m. The power source provides a voltage that is a DC voltage below 60 V or an AC voltage of 25 V RMS.

A cross-sectional area of the heating conductor 106 is between 0.007 mm$^2$ and 0.8 mm$^2$, equaling to wires 106 of 0.1 to 1.0 mm diameter. Conductive films 116 must have according dimensions, typically these films have thicknesses in the range of 5 µm to 25 µm. The temperature of the conductor during the heating is at least 120° C., max. 450° C., for a heating time of 20 minutes or less. The value of 120° C. is a typical shrink temperature for heat shrink products. There are variants that shrink at 110° C. and a very special material which is not used on energy products starts to shrink at 65° C. Given temperature losses to the environment, the temperature of the conductors must be far above 120° C.

The above parameters define a broad working space. Depending on the geometry of the heat shrink product and the conductors 106, the heating system can be defined for instance according to the following examples.

A typical MV joint body has a wall thickness of 3.5 mm of the heat shrink layer (plus elastomeric layer), a length of 420 mm and an outer diameter of 68 mm (surface area is 9 dm$^2$). In successful trials six heating units 120 with 3.3 meter of wire each (diameter 0.22 mm) were used. With a power source providing 24 V, these six heating units 120 were connected in parallel and heated up to 200° C. to 350° C. temperature of the wires 106. The shrink time was 10 min, using thermal insulation and heat spreading.

If the wire 106 diameters are chosen smaller, then each heating unit 120 must have less meters of wire 106. Accordingly, more than six heating units 120 are to be configured to allow a 24 V power source to heat up the heat shrink component to the required temperatures. In an embodiment, a circumferential distance between heating wires 106 may be below 50 mm, such as below 20 mm, in the non-recovered condition, reducing any issues with distributing the heating energy.

If another heat shrink product has less surface area, then a lower number of heating units 120 (thus less meters of wire) are needed.

If another heat shrink product has a lower wall thickness, then a comparably lower number of heating systems and less meters of wire are needed. The dependency on the wall thickness does not seem linear. It appears that even a stack of multiple heat shrink sleeves resulting in 10 mm total wall thickness can be heated with about the same settings as the typical MV joint body having a wall thickness of 3.5 mm. There is, of course, a dependency on the overall shrink behavior of the particular heat shrink material. By adapting the composition of the heat shrink material, the shrink temperature and the ease of shrinking can be varied.

What is claimed is:

1. A heat shrink component, comprising:
a heat shrink layer; and
a heating unit comprised of a continuous electrically conductive lead disposed entirely within and in direct thermal contact with at least a part of the heat shrink layer and configured for heating the heat shrink layer to a heat shrink temperature, the continuous electrically conductive lead formed of a plurality of individual uncoated copper and/or aluminum elongated wire sections and having an electrical conductivity of more than $3 \cdot 10^7$ S/m, the elongated wire sections serially interconnect to form the continuous electrically conductive lead, the heat shrink component having a first dimension in an expanded state and a second dimension after heating, the first dimension being larger than the second dimension.

2. The heat shrink component of claim 1, wherein the heating unit includes a plurality of heating elements interconnected by the electrically conductive lead.

3. The heat shrink component of claim 1, wherein the heat shrink layer is formed at least partly as a sleeve with a longitudinal axis, the sleeve covering at least a part of an electrical connection and/or a part of a termination.

4. The heat shrink component of claim 1, wherein the electrically conductive lead is a metal wire having a cross-section with a round, an oval, or a polygonal shape.

5. The heat shrink component of claim 1, wherein the electrically conductive lead includes copper and has an electrical conductivity greater than $4 \cdot 10^7$ S/m.

6. The heat shrink component of claim 1, wherein the electrically conductive lead includes a plurality of sections that are electrically connected in series and/or in parallel.

7. The heat shrink component of claim 2, wherein at least one of the heating elements is a semiconductor heating element.

8. The heat shrink component of claim 3, wherein the heating unit at least partially encompasses the sleeve.

9. The heat shrink component of claim 3, wherein the electrically conductive lead is a plurality of ring-shaped wires arranged around the longitudinal axis of the sleeve.

10. The heat shrink component of claim 3, wherein the electrically conductive lead is wound in a helical configuration around the heat shrink layer.

11. The heat shrink component of claim 3, wherein the electrically conductive lead has the plurality of interconnected elongated wire sections extending along the longitudinal axis and distributed around a circumference of the sleeve.

12. The heat shrink component of claim 3, wherein the heat shrink layer is a seamless tube.

13. A heat shrink component, comprising:
a heat shrink layer; and
a heating unit disposed entirely within and in direct thermal contact with at least a part of the heat shrink layer and configured for heating the heat shrink layer to a heat shrink temperature, the heating unit including an uncoated continuous electrically conductive lead formed of copper and/or aluminum and having an electrical conductivity of more than $3 \cdot 10^7$ S/m, the heat shrink component having a first dimension in an expanded state and a second dimension after heating, the first dimension being larger than the second dimension, wherein the electrically conductive lead is an electrically conductive film.

14. The heat shrink component of claim 13, wherein the heat shrink layer is a seamless tube.

15. A heat shrink component for energy products, comprising:
a heat shrink layer; and
a heating unit comprised of a power source providing a DC voltage below 60 V or an AC voltage of 25 V RMS continuous connected to a continuous electrically conductive lead disposed entirely within and in thermal contact with at least a part of the heat shrink layer configured for heating the heat shrink layer to a heat shrink temperature, the continuous electrically conductive lead formed of a plurality of individual uncoated copper and/or aluminum elongated wire sections and having a cross-sectional area between 0.007 mm$^2$ and 0.8 mm$^2$ and an electrical conductivity of more than $3 \cdot 10^7$ S/m, the elongated wire sections serially interconnect to form the continuous electrically conductive lead,
whereby the temperature of the conductor during heating is at least 120° C. and the heat shrink component shrinks from a first dimension in an expanded state to a second dimension after heating, the first dimension being larger than the second dimension.

16. The heat shrink component of claim 15, wherein the heat shrink component consists of non-cross-linked polymer.

* * * * *